US008526061B2

(12) United States Patent
Shirata

(10) Patent No.: US 8,526,061 B2
(45) Date of Patent: Sep. 3, 2013

(54) IMAGE PROCESSING APPARATUS, IMAGE PROCESSING METHOD, AND COMPUTER PROGRAM PRODUCT

(75) Inventor: Yasunobu Shirata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 452 days.

(21) Appl. No.: 12/926,812

(22) Filed: Dec. 10, 2010

(65) Prior Publication Data

US 2011/0141501 A1   Jun. 16, 2011

(30) Foreign Application Priority Data

Dec. 11, 2009   (JP) .................... 2009-282270
Nov. 9, 2010    (JP) .................... 2010-251213

(51) Int. Cl.
*G06K 15/00*   (2006.01)

(52) U.S. Cl.
USPC ............. 358/2.1; 358/1.9; 358/518; 358/540; 358/464; 382/164; 382/165; 382/176; 345/592; 715/211; 715/275

(58) Field of Classification Search
USPC ............ 358/1.9, 2.1, 518, 537, 538, 540, 358/464; 382/162, 164, 165, 176; 345/592; 715/200, 204, 211, 275
See application file for complete search history.

(56) References Cited

U.S. PATENT DOCUMENTS

2008/0013112 A1* 1/2008 Yokoyama et al. ............ 358/1.2
2009/0295824 A1  12/2009 Shirata

FOREIGN PATENT DOCUMENTS

| JP | 4341807 B2   | 11/1992 |
| JP | 10-151830 A  | 6/1998  |
| JP | 2002-207334 A| 7/2002  |

OTHER PUBLICATIONS

Abstract for JP-2004-155015 which corresponds to JP-4341807-B2.

* cited by examiner

*Primary Examiner* — King Poon
*Assistant Examiner* — Jamares Q Washington
(74) *Attorney, Agent, or Firm* — Harness, Dickey & Pierce, P.L.C.

(57) ABSTRACT

An image processing apparatus includes an object type determining unit that determines whether a drawing object in the input image data includes a color character group; a background area extracting unit that extracts the background area on which the color character group is formed in the drawing object; a monochromatic conversion unit that, when the drawing object is determined to include the color character group, generates monochromatic image data by performing monochromatic conversion of the input image data with minimum luminance of a main color; a pattern generating unit that, when the drawing object is determined to include the color character group, generates, according to the hue of the color character group, pattern image data to be added to the background area of the post-monochromatic-conversion color character group; and a synthesizing unit that synthesizes the monochromatic image data and the pattern image data.

19 Claims, 11 Drawing Sheets

FIG. 4

| RANGES OF HUE H | 0 OR MORE BUT NOT EXCEEDING 60 | 60 OR MORE BUT NOT EXCEEDING 120 | 120 OR MORE BUT NOT EXCEEDING 180 | 180 OR MORE BUT NOT EXCEEDING 240 | 240 OR MORE BUT NOT EXCEEDING 300 | 300 OR MORE BUT NOT EXCEEDING 360 |
|---|---|---|---|---|---|---|
| PATTERN | PATTERN 1 | PATTERN 2 | PATTERN 3 | PATTERN 4 | PATTERN 5 | PATTERN 6 |

FIG. 5

| RANGES OF HUE H | 0 OR MORE BUT NOT EXCEEDING 60 | 60 OR MORE BUT NOT EXCEEDING 120 | 120 OR MORE BUT NOT EXCEEDING 180 | 180 OR MORE BUT NOT EXCEEDING 240 | 240 OR MORE BUT NOT EXCEEDING 300 | 300 OR MORE BUT NOT EXCEEDING 360 |
|---|---|---|---|---|---|---|
| PATTERN (DATA VALUE) | PATTERN 1 (0) | PATTERN 2 (43) | PATTERN 3 (85) | PATTERN 4 (127) | PATTERN 5 (170) | PATTERN 6 (213) |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-282270 filed in Japan on Dec. 11, 2009 and Japanese Patent Application No. 2010-251213 filed in Japan on Nov. 9, 2010.

BACKGROUND OF THE INVENTION

1. Field of the Invention

The present invention relates to an image processing apparatus, an image processing method, and a computer program product for image processing.

2. Description of the Related Art

In recent years, the increased use of color documents has had an impact on, for example, the printing of documents created by individuals or by business enterprises, the displaying of such documents on computer displays, or the displaying of such documents on web pages available on the Web. In these cases, documents including colored characters or color images are created and then subjected to color printing or color display.

In such color documents, colored characters or color-coding with a plurality of colors is often used while grouping reminder notations or graphs in such a way that the colors on their own express important information.

However, because of the fact that color printing is generally expensive as compared with black-and-white printing, it is often the case that black-and-white printing is preferred due to a cost-cutting perspective.

For that reason, even if color documents are created in which the colors themselves express important information, sometimes the information expressed by the colors is lost.

Usually, in the case of performing black-and-white printing of a color document, the luminance components are extracted from the color information in the color image data and the document is printed in such a way that the luminance components are reproduced.

Hence, even when two different colors are used that have equivalent luminance components, it becomes difficult to distinguish those colors on the printed material. Besides, colors having high luminance are reproduced in a pale manner (because the high luminance makes it difficult to distinguish the color from the white paper). Thus, if coloring is done to emphasize reminders, it has the contrary effect and reminders become rather inconspicuous.

A technology has already been disclosed for preserving the differences in colors in a color document even when the document is subjected to black-and-white printing (see Japanese Patent Application Laid-open No. H10-151830). In that technology, the colors and sizes of the colored characters in the original are recognized and, depending on the colors and sizes, small characters are thickened or the character fonts are altered to fonts having textured characters.

Moreover, in recent years, color image forming apparatuses with two-color-printing mechanism or two-color-printing image forming apparatuses have been developed in which only two colors are usable for printing. During two-color printing, although the color expression remains inferior to color printing, an additional color is expressed other than black-and-white printing. Hence, it becomes possible to perform inexpensive image formation by reducing the consumables.

In the case of two-color printing, usually, color discrimination is performed from color document data and the achromatic portion of the document is printed with a different color than the color used for printing the chromatic portion. In that regard, the recent developments have made it possible for the users to select two different colors to be used for printing.

However, in the conventional technology of black-and-white printing, since character fonts are altered for the purpose of preserving the color differences, the small-sized characters get reproduced as thickly smashed characters thereby causing decline in the character viewability.

Moreover, in the conventional technology of two-color printing, since the achromatic portion and the chromatic portion in color document data are printed with two different colors, the chromatic portion is entirely printed with the same color. As a result, it becomes difficult to distinguish between the actual colors on the printed material. For example, assume that the color document includes characters in black, red, and blue colors. In that case, the red and blue colors are printed in the same color. Consequently, those colors become indistinguishable on the printed material. Thus, for example, instead of classifying the characters into the achromatic portion and the chromatic portion for color discrimination, the settings can be changed where the red color is printed with red color, and a different color than the red color is printed by the colors other than the red color. However, even in the case when color discrimination is done with such settings before performing two-color printing; if the color document includes characters in black, red, and blue colors, then the black and blue colors get reproduced in the same color. Consequently, the color differences present in the color document become indistinguishable on the printed material.

Thus, in the conventional technology, when the input color image data is converted into two-color data before being output, there occurs decline in the character viewability and the color discrimination property.

SUMMARY OF THE INVENTION

It is an object of the present invention to at least partially solve the problems in the conventional technology.

According to an aspect of the present invention, there is provided an image processing apparatus comprising: an object type determining unit that, for each drawing object in input image data, makes use of a type and color information of the drawing object and determines whether the drawing object includes a color character group of a single or more characters; a background area extracting unit that, when the drawing object is determined to include the color character group, extracts a background area on which the color character group is formed in the drawing object for each color character group; a monochromatic conversion unit that receives specification of a main color as a printing color and specification of a color expression color, and, when the drawing object is determined not to include the color character group, generates monochromatic image data by performing monochromatic conversion of the input image data with a predetermined luminance value, and when the drawing object is determined to include the color character group, generates monochromatic image data by performing monochromatic conversion of the input image data with minimum luminance of the main color; a pattern generating unit that, when the drawing object is determined to include the color character group, obtains a hue of the color character group and, according to the hue, generates pattern image data to be added to the background area of post-monochromatic-conversion color character group; and a synthesizing unit that synthesizes the monochromatic image data and the pattern image data.

According to another aspect of the present invention, there is provided an image processing method implemented in an image processing apparatus, comprising: determining, with respect to each drawing object in input image data, whether the drawing object includes a color character group of a single or more characters by making use of a type and color information of the drawing object; extracting, when the drawing object is determined to include the color character group, a background area on which the color character group is formed in the drawing object for each color character group; first-generating that includes receiving specification of a main color as a printing color and specification of a color expression color, and, when the drawing object is determined not to include the color character group, generating monochromatic image data by performing monochromatic conversion of the input image data with a predetermined luminance value, and when the drawing object is determined to include the color character group, generating monochromatic image data by performing monochromatic conversion of the input image data with minimum luminance of the main color; second-generating that includes obtaining, when the drawing object is determined to include the color character group, a hue of the color character group and, according to the hue, generating pattern image data to be added to the background area of post-monochromatic-conversion color character group; and synthesizing the monochromatic image data and the pattern image data.

According to still another aspect of the present invention, there is provided a computer program product comprising a non-transitory computer-usable medium having computer-readable program codes embodied in the medium for an image processing method implemented in an image processing apparatus, the program codes when executed causing a computer to execute the step of the image processing method mentioned above.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 illustrates an example of design pattern image data;

FIG. 5 illustrates an example of density pattern image data;

DETAILED DESCRIPTION OF THE PREFERRED EMBODIMENTS

Exemplary embodiments of an image processing apparatus, an image processing method, and a computer program product for image processing according to the present invention are described in detail below with reference to the accompanying drawings. The present invention is not limited to these exemplary embodiments.

First Embodiment

Figure 1:
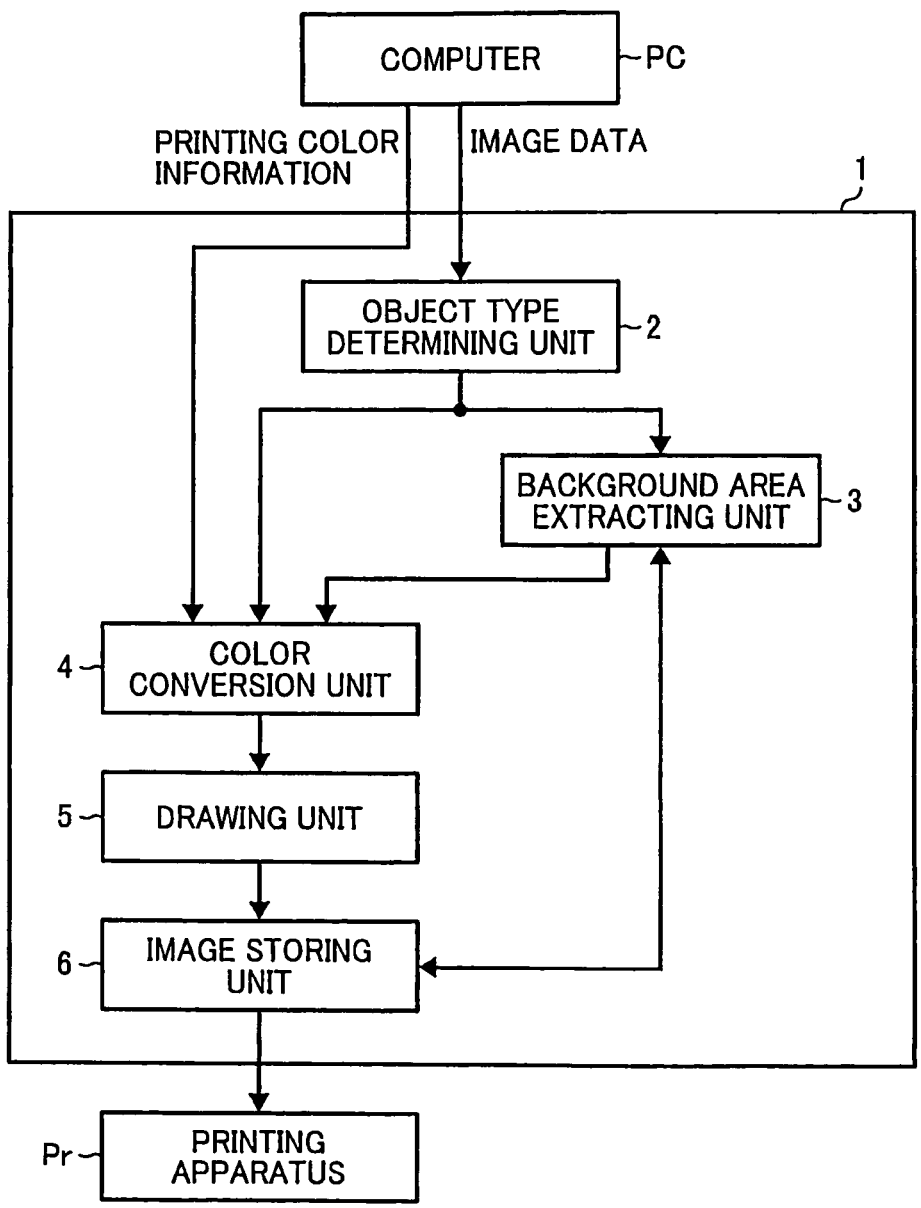
FIG. 1 is a block diagram of a functional configuration of an image processing apparatus according to the first embodiment.
Figure 2:
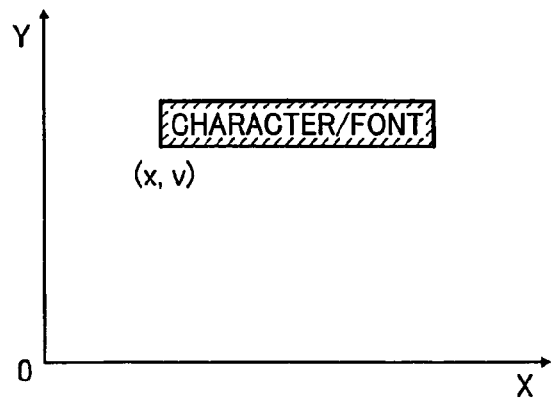
FIG. 2 illustrates an example of a background area extracting operation according to the first embodiment.

FIGS. 1 to 9 are diagrams for explaining an image processing apparatus, an image processing method, and a computer program product for image processing according to a first embodiment of the present invention. FIG. 1 is a block diagram of a functional configuration of an image processing apparatus 1 according to the first embodiment.

As illustrated in FIG. 1, the image processing apparatus 1 is connected to a computer PC functioning as an image input apparatus for inputting color image data and is connected to a printing apparatus Pr functioning as an image forming apparatus with two-color-printing mechanism. Meanwhile, although the image processing apparatus 1 according to the first embodiment is configured to be an independent apparatus, it is also possible to incorporate the image processing apparatus 1 in an image input apparatus such as the computer PC or in an image forming apparatus such as a printing apparatus. Moreover, the image processing apparatus 1 can be incorporated along with an image input apparatus and an image forming apparatus in a single apparatus such as a copying machine, a multifunction product, or a facsimileing machine. Furthermore, if the image processing apparatus 1 is incorporated in the computer PC for the purpose of performing image processing (described later), then image processing programs or computer program product for image processing according to the present embodiment are loaded in a printer driver installed in the computer PC for the purpose of executing an image processing method.

In the computer PC, with respect to a color document such as a compound document including graphics or characters created by an application software such as a document creating software, a spreadsheet software, plotting software, or a desktop publishing (DTP) software, and including photographs or images imported from outside; when a two-color-printing instruction that is issued along with the specification of two colors (a main color and a color expression color) to be used in two-color printing, it is followed by the issuance of a printing instruction; and the computer PC outputs the color image data of the color document and the specified printing color information to the image processing apparatus 1.

Based on the color image data and the printing color information received from the computer PC, the image processing apparatus 1 converts the input color image data into color image data in cyan (C), magenta (M), yellow (Y), and black (B) colors that is printable by the printing apparatus Pr or into image data to be used for reproducing two colors from among, the CMYK colors during two-color printing, or converts the input color image data into color image data and transparency data or into image data and transparency data to be used for reproducing a single color from among the CMYK color during two-color printing. The image processing apparatus 1 then sends the converted data to the printing apparatus Pr. Herein, regarding the image data to be used for reproducing two colors from among the CMYK colors during two-color printing; for example, when two-color printing is to be performed with black and red colors, the K (=black) toner and the M+Y (=red) toner from among the CMYK toners are used to reproduce the two colors of black and red as the printing result. Thus, as the CMYK image data, three colors of K, M, and Y are used. The same is the case with the image data to be used for reproducing a single color from among the CMYK colors during two-color printing. The following description is given under the assumption that two-color printing is performed.

As illustrated in FIG. 1, the image processing apparatus 1 according to the first embodiment includes an object type determining unit 2, a background area extracting unit 3, a color conversion unit 4, a drawing unit 5, and an image storing unit 6. In the case of two-color printing, the image processing apparatus 1 receives, from the computer PC, RGB (red, green, blue) color image data and printing color information that specifies the two colors to be used during two-color printing. Herein, the printing color information is the information regarding the two output colors that are specified by the user to the computer PC and that include a main color (e.g., black) and a color expression color (e.g., red).

More particularly, as the color image data, the image processing apparatus 1 receives RGB gradation data. Although each color component in that data generally has 8 bit=256 gradations, the color components can also have 64 gradations or 512 gradations.

The object type determining unit 2 analyses the types of drawing objects (character code, graphic code, raster code) or the color information (type, size, color, thickness) from the input color image data, and determines and recognizes color character groups of a single or more characters as objects drawn with color characters in the input color image data. Then, the object type determining unit 2 outputs, to the background area extracting unit 3 and the color conversion unit 4, the color image data and object information, which is the recognition result indicating whether the drawing objects to be controlled in the color image data are the color character groups that are objects to be drawn with color characters. For example, if a drawing object has character code as the type and if the color information indicates that the drawing object is a chromatic object, then the object type determining unit 2 outputs object information in which it is specified that the drawing object is to be drawn with color characters, that is, it is specified that the drawing object is a color character group. Herein, in order to determine whether the color information indicates a chromatic object, the object type determining unit 2 determines whether RGB values are identical.

Regarding the input color image data corresponding to the object information received from the object type determining unit 2, the background area extracting unit 3 extracts, for each color character group, a rectangular area (e.g., the hatched area in FIG. 2) enclosing that color character group and then outputs background area information that includes the addresses of the extracted rectangular areas to the color conversion unit 4. For example, for a color character group "character/font" illustrated in FIG. 2, the background area extracting unit 3 extracts the background area that is a rectangular area enclosing that color character group and then outputs, to the color conversion unit 4, background area information that includes at least the drawing start address and the drawing end address defining that background area. The background area information of a color character group (i.e., the drawing start address and the drawing end address of a rectangular area) that is extracted by the background area extracting unit 3 varies in size depending on the character size and varies in location depending on the drawing start address for drawing the characters.

The color conversion unit 4 receives, from the computer PC, the printing color information indicating the output colors specified by the user, receives the object information from the object type determining unit 2, and receives the background area information from the background area extracting unit 3. Then, based on the background area information, the color conversion unit 4 converts the color image data into image data suitable for image formation with the two colors (e.g., black and red) specified in the printing color information and then outputs the image data to the drawing unit 5.

With respect to the image data received from the color conversion unit 4, the drawing unit 5 performs expansion, synthesis, gamma conversion, and halftone processing according to drawing instructions written in the print description language (PDL) that is interpretable by the printing apparatus Pr, and outputs a print image (bit map image data) to the image storing unit 6.

Subsequently, the print image worth a single page or a plurality of pages drawn by the drawing unit 5 is temporarily stored in the image storing unit 6 so that the print image can be later sent to the printing apparatus Pr.

Figure 3:
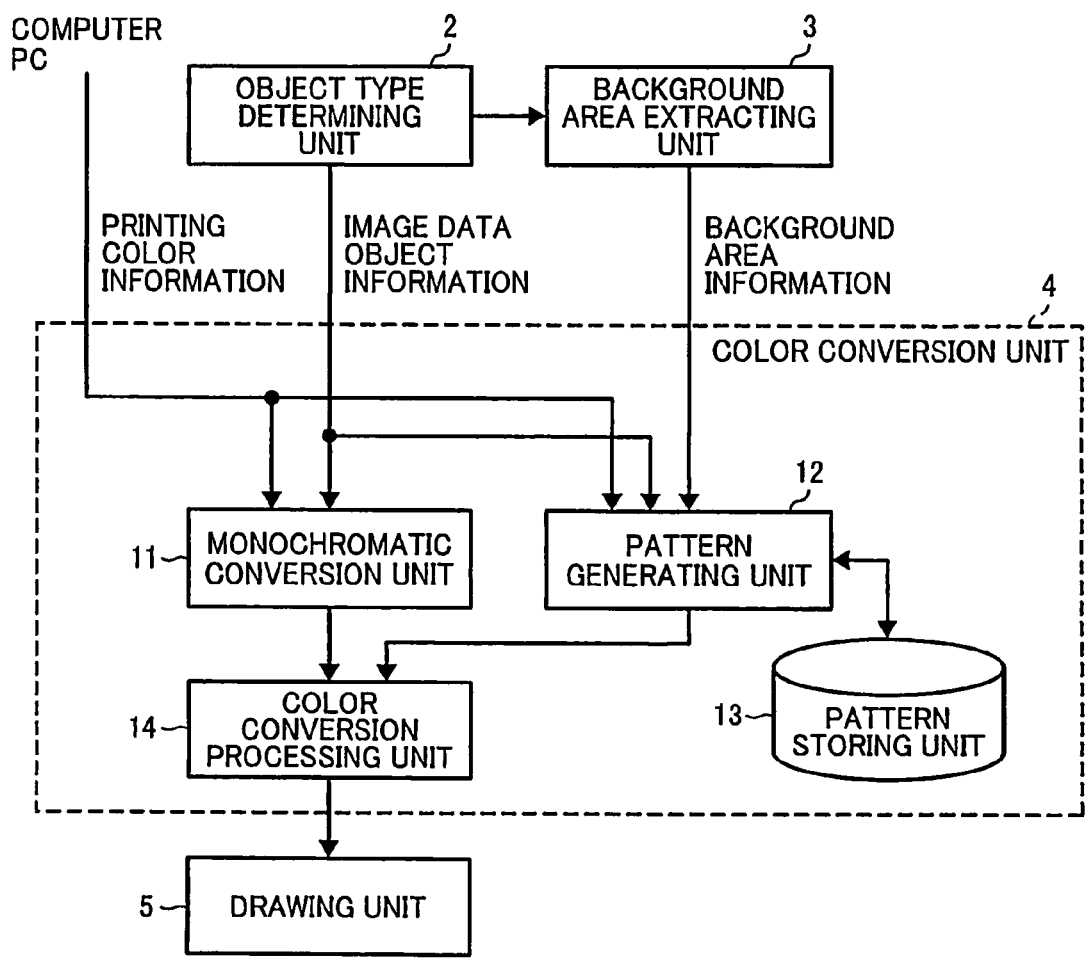
FIG. 3 is a block diagram of a configuration of a color conversion unit according to the first embodiment.

As illustrated in FIG. 3, the color conversion unit 4 includes a monochromatic conversion unit 11, a pattern generating unit 12, a pattern storing unit 13, and a color conversion processing unit 14 that functions as a synthesizing unit. The monochromatic conversion unit 11 receives the printing color information from the computer PC, and receives the input color image data and the object information from the object type determining unit 2. The pattern generating unit 12 receives the printing color information from the computer PC, receives the input color image data and the object information from the object type determining unit 2, and receives the background area information from the background area extracting unit 3.

The monochromatic conversion unit 11 performs monochromatic conversion of colors (Ri, Gi, Bi), which are included in the color information of the input color image data received from the object type determining unit 2, into colors (Ro, Go, Bo) and outputs those colors to the color conversion processing unit 14. Besides, when the object information received along with the input color image data indicates that image data other than a color character group, the monochromatic conversion unit 11 performs monochromatic conversion of the colors included in the color information of the input color image data on the basis of the luminance value. On the other hand, when the object information indicates a color character group, the monochromatic conversion unit 11 performs monochromatic conversion in such a way that the colors in the color information have the minimum luminance for the purpose of outputting dark shades.

More particularly, when the object information received along with the input color image data indicates that image data other than a color character group, the monochromatic conversion unit 11 converts the colors (Ri, Gi, Bi), which are included in the color information of the input color image data received from the object type determining unit 2, into a luminance value Yi using Equation (1) given below.

$$Yi = 0.3 \times Ri + 0.6 \times Gi + 0.1 \times Bi \quad (1)$$

Subsequently, using the luminance value obtained using Equation (1), the monochromatic conversion unit 11 performs monochromatic conversion of the colors (Ri, Gi, Bi), which are included in the color information of the input color image data, into the colors (Ro, Go, Bo)=(Yi, Yi, Yi) as monochromatic image data.

In contrast, when the object information indicates a color character group, the monochromatic conversion unit 11 performs monochromatic conversion of the colors (Ri, Gi, Bi), which are included in the color information of the input color image data, into the colors (Ro, Go, Bo)=(0, 0, 0) as monochromatic image data. That is, when a drawing object is a color character group, the monochromatic conversion unit 11 performs monochromatic conversion into colors having the minimum luminance so that the color character group is prevented from being reproduced in a pale manner in the post-monochromatic-conversion image data (monochromatic image data). For example, if black is the main color and red is the color expression color as specified in the printing color information, then the monochromatic conversion unit 11 converts the image data of a color character group into black color that has the minimum luminance.

The pattern generating unit 12 determines, based on the object information that is the recognition result of the object type determining unit 2, whether a drawing object to be controlled is a color character group. If that drawing object is a color character group, then the pattern generating unit 12 calculates a hue H of the characters in that color character group and, depending on the hue H, generates pattern image data to be added to the background area that is defined by the drawing start address and the drawing end address in the background area information.

Depending on the hue H of the characters in a color character group, the pattern generating unit 12 can generate pattern image data in such a way that patterns having different designs are generated or patterns having different densities are generated. That is, the pattern generating unit 12 can generate the pattern image data by which color discrimination is expressed by means of different designs in the pattern image data or by means of different densities in the pattern image data.

More particularly, consider the case of expressing the color discrimination by means of different designs in the pattern image data. For example, as illustrated in FIG. 4, for each range of the hue H divided in a plurality of ranges (six ranges in FIG. 4), the pattern image data having a different design (hereinafter, referred to as "design pattern image data") is registered in a design pattern image table, which is stored in the pattern storing unit 13. In this case, based on the hue H of the characters in a color character group, the pattern generating unit 12 obtains design pattern image data from the design pattern image table stored in the pattern storing unit 13, and generates design pattern image data of the color expression color specified in the printing color information.

Consider the case of expressing the color discrimination by means of different densities in the pattern image data. For example, as illustrated in FIG. 5, for each range of the hue H divided in a plurality of ranges (six ranges in FIG. 5), the pattern image data in which the density values (data values) from "0" to "255" are divided into six levels (hereinafter, referred to as "density pattern image data") is registered in a density pattern image table, which is stored in the pattern storing unit 13. In this case, based on the hue H of the characters in a color character group, the pattern generating unit 12 obtains density pattern image data from the density pattern image table stored in the pattern storing unit 13, and generates density pattern image data of the color expression color specified in the printing color information.

Then, the pattern generating unit 12 outputs the generated pattern image data to the color conversion processing unit 14.

Meanwhile, the design pattern image data illustrated in FIG. 4 and the density pattern image data illustrated in FIG. 5 are only exemplary, and it is possible to arbitrarily increase the number of patterns by shortening the hue ranges and to arbitrarily set a setting value of the hue range (a setting value of zero or more but not exceeding 60, for example). For example, the pattern generating unit 12 determines the hue range to which the calculated hue H belongs and, if a pattern of pattern-1 is selected according to the determination result, performs pattern generation in the background area of the color character group input from the background area extracting unit (i.e., the hatched area in FIG. 2).

The color conversion processing unit 14 obtains composite image data by synthesizing the RGB monochromatic image data input from the monochromatic conversion unit 11 and the pattern image data input from the pattern generating unit 12, and converts the composite image data into data of the output color components of C, M, Y, and K corresponding to the printing apparatus Pr. During this color conversion, the color conversion processing unit 14 implements memory map interpolation for conversion into CMYK data.

Figure 6:
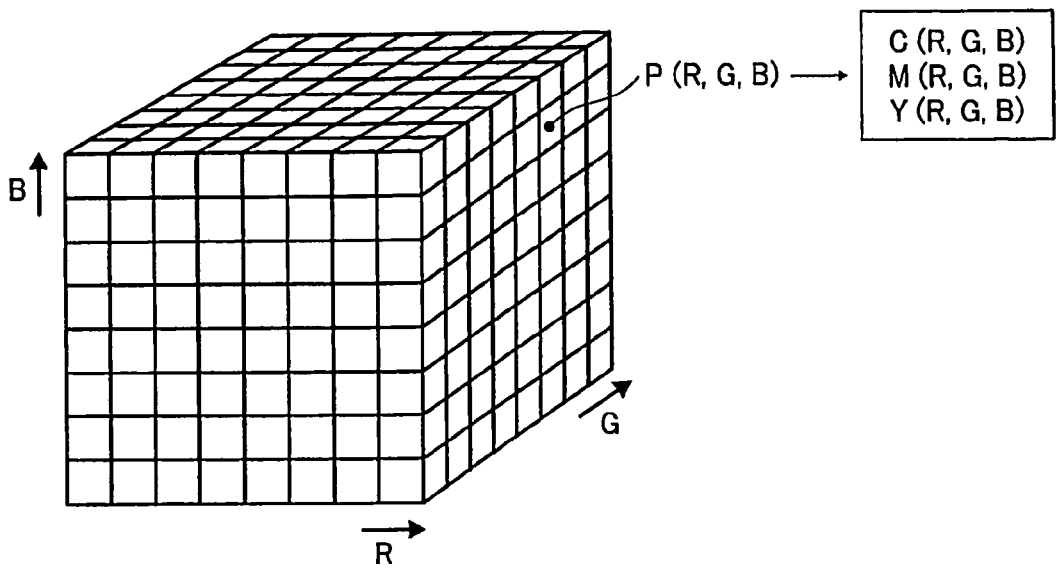
FIG. 6 is an explanatory diagram of memory map interpolation performed during a color conversion operation.

That is, as illustrated in FIG. 6, when the RGB color space is considered to be the input color space, the color conversion processing unit 14 divides the RGB color space into solid figures (cubes in FIG. 6) of the same type. Subsequently, in order to obtain the output values (data of C, M, Y, and K obtained by conversion) at an input coordinate P(R, G, B), the color conversion processing unit 14 selects the cube including the input coordinate P(R, G, B), and performs linear interpolation based on the output values at the apices set in advance at eight points on the selected cube and based on the location of the input coordinate P(R, G, B) included in the cube (i.e., distance from each apex). Then, the color conversion processing unit 14 outputs the CMYK data obtained upon color conversion to the drawing unit 5.

By performing the abovementioned operations, the image processing apparatus 1 outputs the CMYK data to the printing apparatus Pr via the image storing unit 6.

Figure 7:
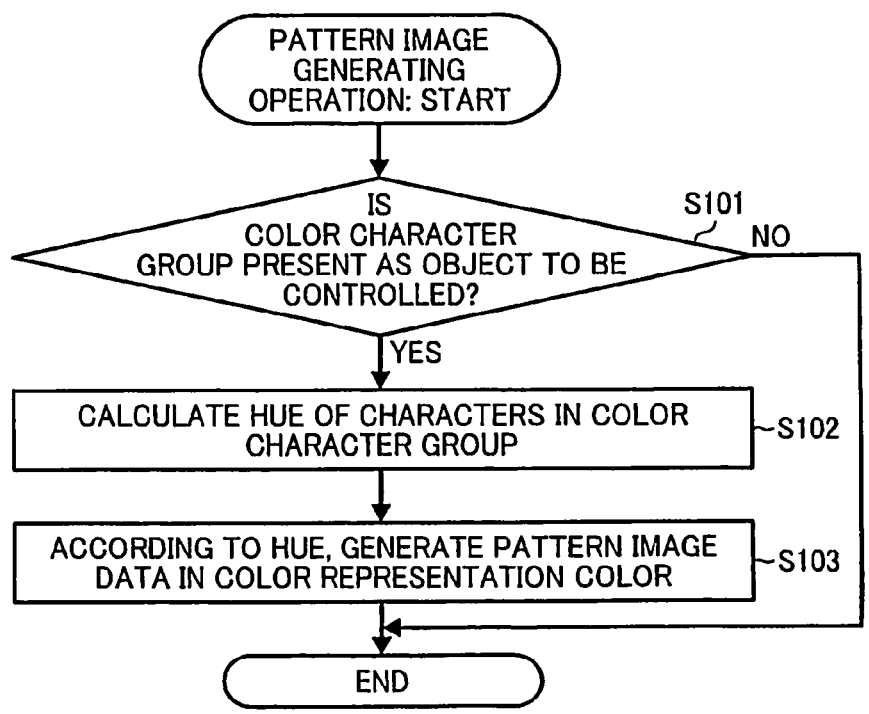
FIG. 7 is a flowchart for explaining the sequence in a pattern image generating operation according to the first embodiment.

Explained below with reference to FIG. 7 is the pattern image generating operation performed by the pattern generating unit 12 according to the present embodiment.

Firstly, the pattern generating unit determines whether a drawing object to be controlled is a color character group (Step S101). If the drawing object to be controlled is not a color character group (No at Step S101), then the pattern image generating operation is terminated because there is no need to generate pattern image data.

Thus, only when the drawing object to be controlled is a color character group (Yes at Step S101), the pattern generating unit 12 calculates the hue H of the characters in the color character group using the following equations (Step S102).

MAX=max(Ri, Gi, Bi); {where, max( ) is a function for selecting the maximum value}

MIN=min(Ri, Gi, Bi); {where, min( ) is a function for selecting the minimum value} when MAX=MIN is true, hue H=0 when MAX=MIN is false, with $Cr=(MAX-Ri)/(MAX-MIN)$ $Cg=(MAX-Gi)/(MAX-MIN)$ $Cb=(MAX-Bi)/(MAXMIN)$, when MAX=$Ri$, $h=60\times(Cb-Cg)$ when MAX=$Gi$, $h=60\times(2+Cr-Cb)$ when MAX=$Bi$, $h=60\times(4+Cg-Cr)$ when $h<0$, $H=h+360$ when $h\geq 0$, H=h Upon calculating the hue H in the abovementioned manner, the pattern generating unit 12 reads out, from the pattern storing unit 13, the pattern image data (see FIGS. 4 and 5) corresponding to the calculated hue H of the characters in the color character group, and generates pattern image data of the color expression color (e.g., red) specified in the printing color information (Step S103).

For example, assume that the pattern pattern1 illustrated in FIG. 4 is selected as the pattern image data and that red is specified as the color expression color. In that case, the pattern generating unit 12 generates the hatched portion of the pattern pattern1 illustrated in FIG. 4 with red (255, 0, 0) and generates the other portion with white (255, 255, 255). Moreover, as described above, in the case of generating image data having a different density for each hue H (i.e., generating density pattern image data), the pattern generating unit 12 generates the pattern image data in such a way that, for each hue H, the background area is filled with a different data value. For example, if a pattern pattern3 illustrated in FIG. 5 is selected as the pattern image data and if red is specified as the color expression color, then the pattern generating unit 12 generates a pattern in the background area in such a way that the background area is filled with red (170, 0, 0).

In the case of generating the pattern image data having a different design for each hue H (i.e., generating the design pattern image data), if the pattern pattern1 illustrated in FIG. 4 is selected and if cyan is specified as the color expression color, then the pattern generating unit 12 generates the hatched portion of the pattern pattern1 illustrated in FIG. 4 with cyan (0, 255, 255) and generates the other portion with white (255, 255, 255). Similarly, in the case of generating the pattern image data having a different density for each hue H (i.e., generating the density pattern image data), if the pattern pattern3 illustrated in FIG. 5 is selected and if cyan is specified as the color expression color, then the pattern generating unit 12 generates a pattern in the background area in such a way that the background area is filled with cyan (0, 170, 170). Thus, the pattern generating unit 12 generates the design pattern image data or the density pattern image data of the color specified arbitrarily at the computer PC, and then outputs the generated pattern image data and the printing color information to the color conversion processing unit 14.

Subsequently, the color conversion processing unit 14 synthesizes the RGB data input from the monochromatic conversion unit 11 and the RGB data input from the pattern generating unit 12, and implements memory map interpolation so as to convert the composite image data into CMYK data as described above.

That is, when red is specified as the color expression color, the output values correspond to C, M, and Y, respectively, and the color conversion processing unit 14 measures the relation of the actual input value (L*a*b*−CMY) at the coordinate (R, G, B) on the input color space used in interpolation operation and uses that data for setting in advance the CMY values corresponding to RGB(L*a*b*) calculated by least squares method.

Moreover, the color conversion processing unit 14 converts the CMY signal into a CMYK signal by, for example, the operations given in following equations.

$K=\alpha\times\min(C, M, Y)$ $C'=C-\beta\times K$ $M'=M-\beta\times K$ $Y'=Y-\beta\times K$ Meanwhile, the color conversion method is not limited to the abovementioned method and, for example, the CMY signal can also be obtained directly from the RGB signal.

The color conversion processing unit 14 sends the CMYK image data obtained by conversion to the drawing unit 5, which obtains a print image worth a single page or a plurality of pages according to the drawing instructions written in the print description language (PDL) that is interpretable by the printing apparatus Pr and then temporarily stores the print image in the image storing unit 6 before sending the print image to the printing apparatus Pr.

In this way, in the image processing apparatus 1 according to the present embodiment, the object type determining unit 2 analyzes the type and the color information of each drawing object in the input color image data and determines the objects that are color character groups. Based on the type and the color information of each drawing object, the monochromatic conversion unit 11 of the color conversion unit 4 performs color conversion of the input color image data into image data of a single color that is set in advance as the main color. The background area extracting unit 3 of the color conversion unit 4 then extracts the background area (rectangular area) for each color character group. With respect to each background area, the pattern generating unit 12 of the color conversion unit 4 generates, based on the color information of that background area, predetermined pattern image data (design pattern image data or density pattern image data) with a single color set in advance as the color expression color. Subsequently, the color conversion processing unit 14 of the color conversion unit 4 synthesizes the image data of the main single color and the pattern image data (added data).

Consequently, the color character group can be expressed with the main color and the color discrimination can be expressed with the design pattern image data or the density pattern image data. Thus, with two colors, it becomes possible to appropriately express the character viewability and the color discrimination property of a color character group in the input color image data.

Meanwhile, in the image processing apparatus 1 according to the present embodiment, regarding a color character group, the monochromatic conversion unit 11 performs color conversion into a main single color having the maximum density.

Consequently, during monochromatic conversion of the input color image data, the monochromatic image data is obtained in which the data of color character groups is not reproduced in a pale manner. That enables achieving further enhancement in the character viewability and the color discrimination property of the post-monochromatic-conversion of color character groups.

Moreover, in the image processing apparatus 1 according to the present embodiment, the design pattern image data or the density pattern image data that is preliminarily different for each of a plurality of divided hue ranges is registered in the pattern storing unit 13. Then, the pattern generating unit 12 obtains the hue H from the color information of a color character group; obtains, based on the hue H, the design pattern image data or the density pattern image data from the pattern storing unit 13; and generates the design pattern image data or the density pattern image data of a single color set as the color expression color.

Consequently, depending on the hue H of the characters in a color character group, the pattern image data can be generated in an appropriate and prompt manner. That enables achieving more appropriate and prompt enhancement in the character viewability and the color discrimination property of the color character group.

Meanwhile, in the image processing apparatus 1 according to the present embodiment, the pattern generating unit 12 can also be configured to generate the design pattern image data or the density pattern image data with respect to either the entire background area including a color character group, or only the color character group portion, or the background area excluding the color character group.

In that case, more appropriate pattern image data can be generated according to the hue H of the characters in a color character group. That enables achieving more appropriate enhancement in the character viewability and the color discrimination property of the color character group.

Moreover, in the image processing apparatus 1 according to the present embodiment, the color conversion unit 4 converts the image data of a color character group into image data having the minimum luminance so that the color character group is prevented from being reproduced in a pale manner in the post-monochromatic-conversion image data. That enables achieving further enhancement in the character viewability.

MODIFICATION EXAMPLE

In the image processing apparatus 1 according to the present embodiment, the user is allowed to specify the transparency color as the color expression color in the printing color information. When the transparency color is specified as the color expression color, the following operations are performed.

In the image processing apparatus 1, when the transparency color is specified as the color expression color, the color conversion unit 4 performs color conversion into two colors, namely, the main color and the transparency color specified as the color expression color in the printing color information; converts the input color image data into the data of color components of C, M, Y, and K and into transparency data as the control signal of the printing apparatus Pr; and sends that data to the printing apparatus Pr via the drawing unit 5 and the image storing unit 6. The following explanation is given for the case when black is specified as the main color and the transparency color is specified as the color expression color.

In the image processing apparatus 1, based on the input color image data corresponding to the object information received from the object type determining unit 2, the background area extracting unit 3 extracts information such as the drawing start address and the character color and extracts a background area having characters formed thereon (e.g., the hatched area in FIG. 2), and outputs that information as the background area information to the pattern generating unit 12.

Figure 8:
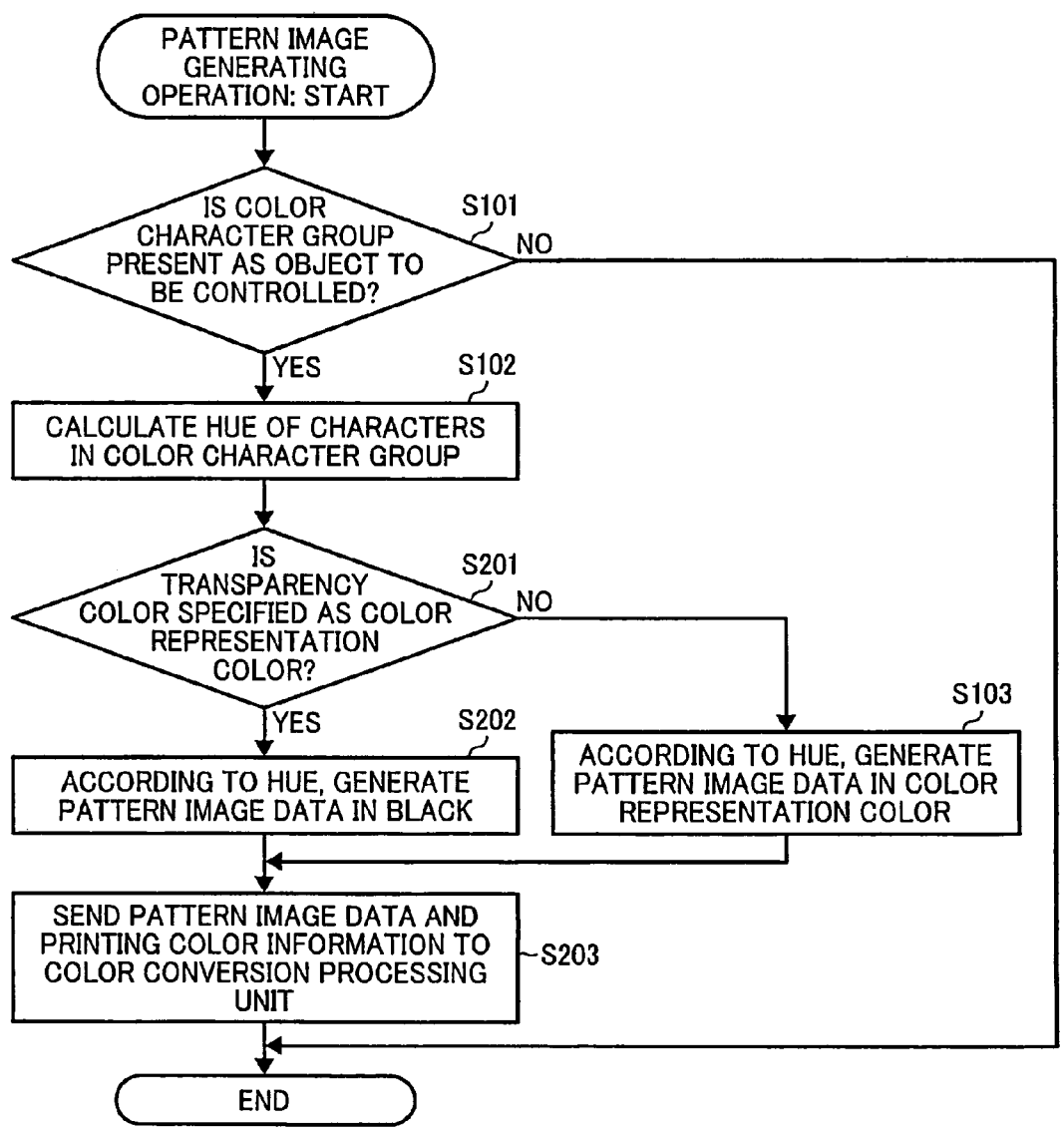
FIG. 8 is a flowchart for explaining the sequence in the pattern image generating operation according to the first embodiment when the transparency color is specified as the color representation color.

Subsequently, the pattern generating unit 12 performs the pattern image generating operation as illustrated in FIG. 8. Herein, in FIG. 8, the operation steps identical to the steps in FIG. 7 are referred to by the same step numbers and their explanation is given only briefly.

As illustrated in FIG. 8, the pattern generating unit 12 determines whether a drawing object to be controlled is a color character group (Step S101). If the drawing object to be controlled is not a color character group (No at Step S101), then the pattern image generating operation is terminated as also illustrated in FIG. 7.

Thus, only when the drawing object to be controlled is a color character group (Yes at Step S101), the pattern generating unit 12 first calculates the hue H of the characters in the color character group (Step S102) and then determines whether the transparency color is specified as the color expression color in the printing color information (Step S201).

If the transparency color is specified as the color expression color in the printing color information (Yes at Step S201), then the pattern generating unit 12 selects the pattern image data (design pattern image data or density pattern image data) according to the values of the hue H and generates pattern image data of the specified color (color expression color) in the printing color information. However, since the transparency color cannot be expressed with RGB colors, the pattern generating unit 12 generates, as a tentative pattern, the pattern image data of, for example, R=G=B (black data) (Step S202). Then, the pattern generating unit 12 sends the generated pattern image data and the printing color information to the color conversion processing unit 14 (Step S203).

For example, consider the case of generating the design pattern image data as illustrated in FIG. 4. In that case, if the pattern pattern1 corresponds to the hue H, then the pattern generating unit 12 generates the hatched portion of the pattern pattern1 with (0, 0, 0) and generates the other portion with (255, 255, 255). Similarly, consider the case of generating the density pattern image data as illustrated in FIG. 5. In that case, if the pattern pattern3 corresponds to the hue H, then the pattern generating unit 12 generates (170, 170, 170) in the background area.

In this way, by using the transparency color (clear toner) as the color expression color, the printing apparatus Pr can be made to output a different glossiness for the area in which image formation is performed with the clear toner as compared to the glossiness for the other areas. Moreover, by varying the amount of clear toner, it becomes possible to have different degrees of glossiness in the area in which formation is performed with the clear toner. Thus, by making use of the clear toner characteristics, different pattern image data (design pattern image data or density pattern image data) can be generated for the background area of a color character group. As a result, it becomes possible to make the color differences distinguishable by means of different glossiness patterns or make the color differences distinguishable by means of different degrees of glossiness in the background area of a color character group.

Meanwhile, if the transparency color is not specified as the color expression color in the printing color information (No at Step S201); then, in an identical manner to the explanation with reference to FIG. 7, the pattern generating unit 12 generates the pattern image data of the color expression color in such a way that, for each hue H, the background area is filled with a different pattern (Step S103), and then sends the generated pattern image data and the printing color information to the color conversion processing unit 14 (Step S203)

Figure 9:
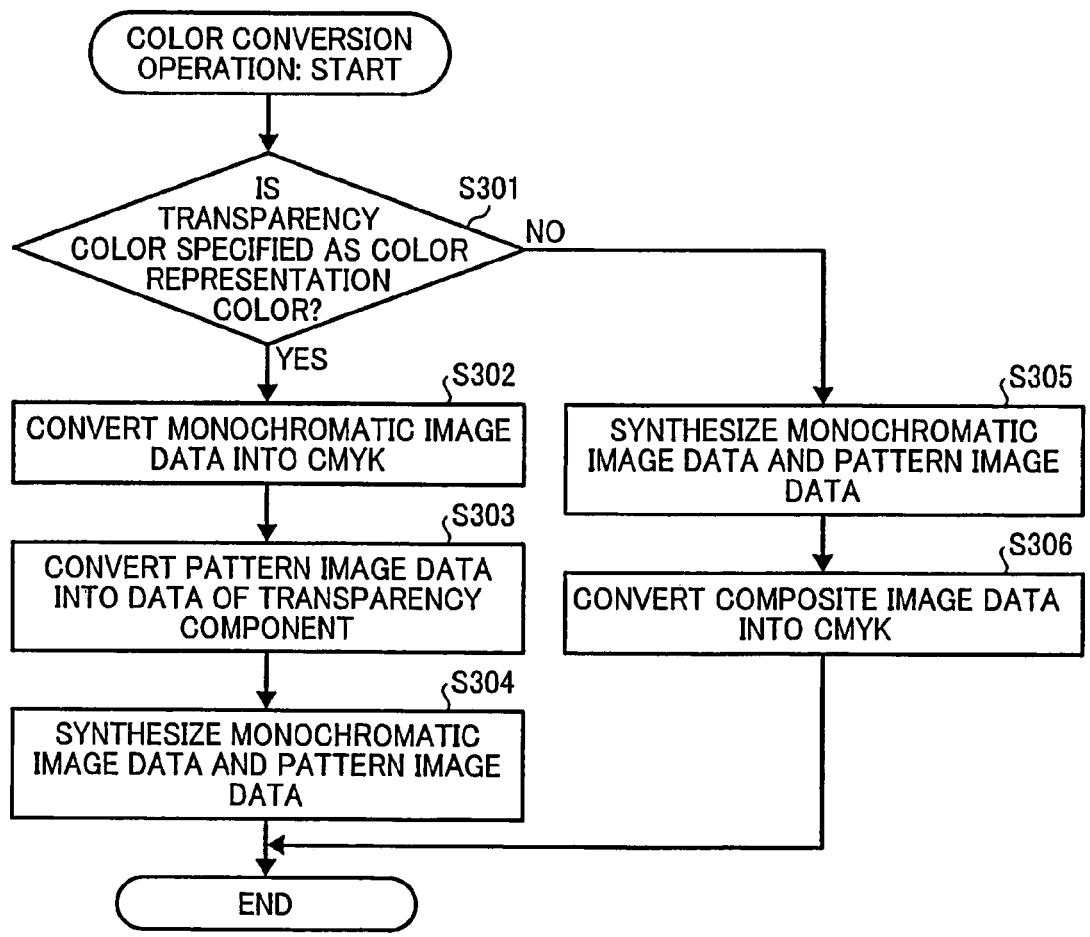
FIG. 9 is a flowchart for explaining the sequence in the color conversion operation according to the first embodiment.

Explained below with reference to FIG. 9 is the color conversion operation performed by the color conversion processing unit 14. Based on the printing color information received from the pattern generating unit 12, the color conversion processing unit 14 determines whether the transparency color is specified as the color expression color (Step S301). If the transparency color is specified as the color expression color (Yes at Step S301), then the color conversion processing unit 14 implements memory map interpolation for converting the monochromatic image data received from the monochromatic conversion unit 11 into output color components C, M, Y, and K of the printing apparatus Pr (Step S302). Subsequently, the color conversion processing unit 14 converts the pattern image data, such as the design pattern image data or the density pattern image data, received from the pattern generating unit 12 into the pattern image data of the transparency component (Step S303). The color conversion processing unit 14 then synthesizes the post-CMYK-conversion monochromatic image data and the pattern image data of the transparency component (Step S304), and outputs the composite image data to the drawing unit 5.

Meanwhile, if the transparency color is not specified as the color expression color (No at Step S301), then the color conversion processing unit 14 synthesizes the RGB monochromatic image data received from the monochromatic conversion unit 11 and the pattern image data received from the pattern generating unit 12 (Step S305), converts the composite image data into CMYK (Step S306), and outputs the image data obtained by conversion to the drawing unit 5.

In this way, in the image processing apparatus 1 according to the present embodiment, when the transparency color is specified as the color expression color, the pattern generating unit 12 generates the design pattern image data or the density pattern image data of the transparency color with respect to either the entire background area including a color character group, or only the color character group portion, or the background area excluding the color character group.

Consequently, by adding the design pattern image data or the density pattern image data of the transparency color in the rectangular area of a color character group, the color differences can be expressed by means of different degrees of glossiness. That enables achieving enhancement in the character viewability by means of different degrees of glossiness of the main color and the transparency color, and makes it possible to distinguish the colors in a color character group.

Second Embodiment

Figure 10:
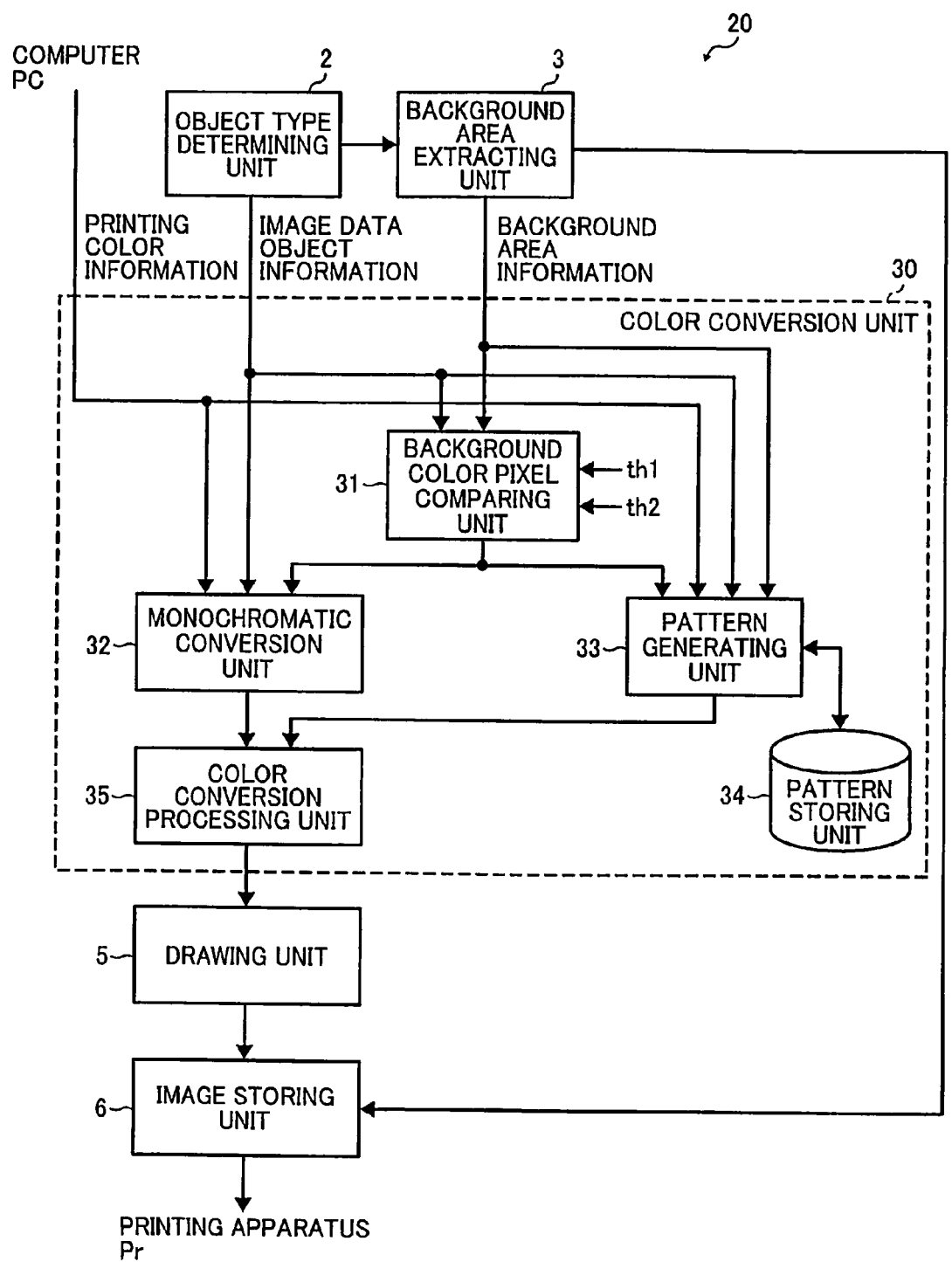
FIG. 10 is a block diagram of a functional configuration of an image processing apparatus according to a second embodiment of the present invention.
Figure 11:
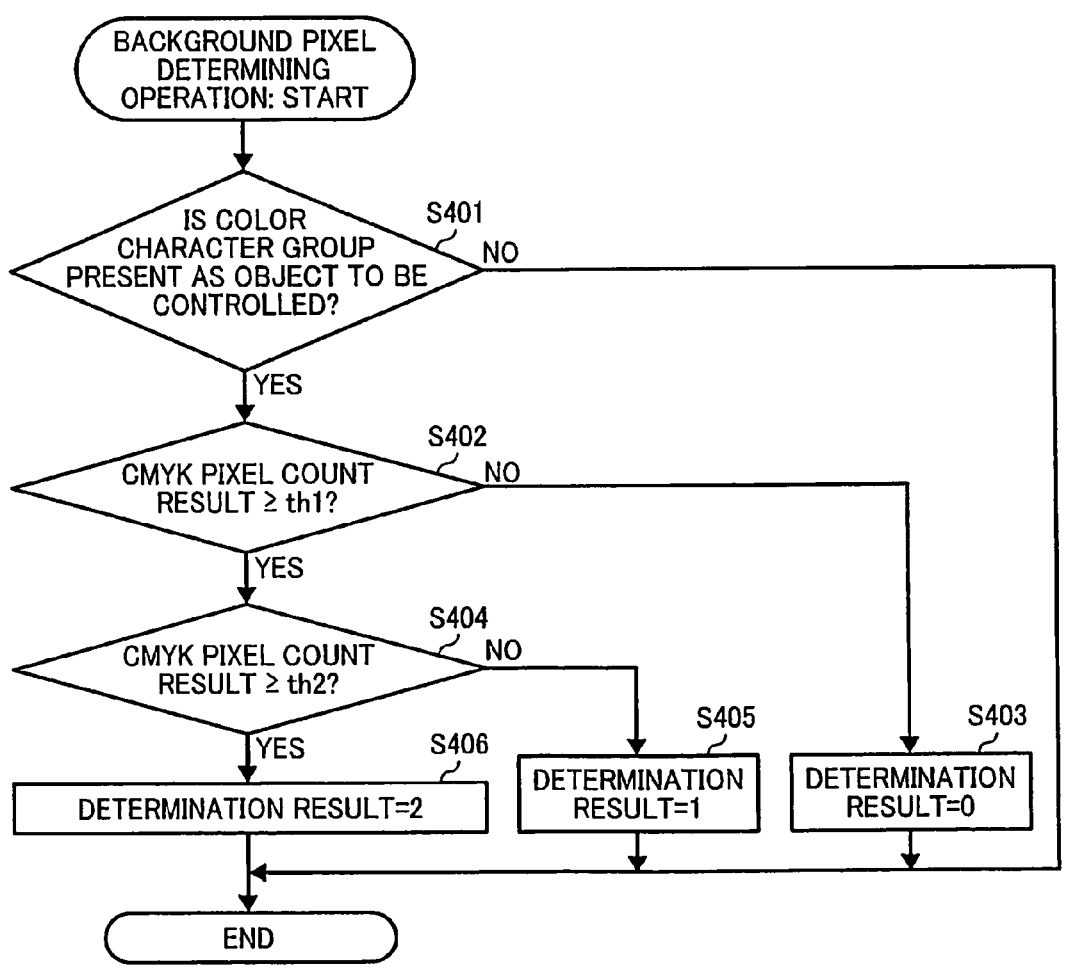
FIG. 11 is a flowchart for explaining the sequence in a background pixel determining operation according to the second embodiment.
Figure 12:
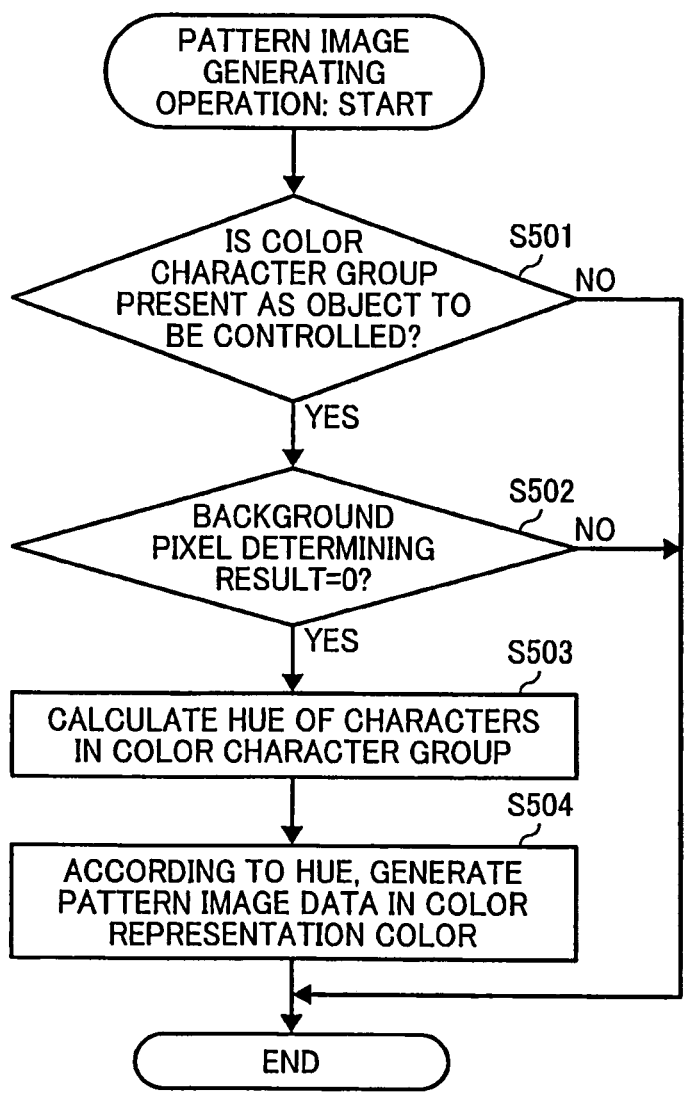
FIG. 12 is a flowchart for explaining the sequence in the pattern image generating operation according to the second embodiment.

FIGS. 10 to 12 are diagrams for explaining an image processing apparatus, an image processing method, and a computer program product according to a second embodiment of the present invention. FIG. 10 is a block diagram of a functional configuration of an image processing apparatus 20 according to the second embodiment.

The image processing apparatus 20 according to the present embodiment is implemented as an image processing apparatus identical to the image processing apparatus 1 according to the first embodiment. In the explanation of the second embodiment, the constituent elements identical to those in the image processing apparatus 1 are referred to by the same reference numerals and the explanation thereof is not repeated or is given only briefly.

In the image processing apparatus 20 according to the present embodiment, on the background area of a color character group, if image data such as a hatched pattern or a color character group on a colored background is present as a drawing object other than that color character group; then pattern image data is not generated. That is, pattern image data is generated only in the background area of a color character group having the white background.

As illustrated in FIG. 10, the image processing apparatus 20 according to the present embodiment includes the object type determining unit 2, the background area extracting unit 3, the drawing unit 5, the image storing unit 6, and a color conversion unit 30. Herein, the drawing unit 5 and the image storing unit 6 have the same functions and configurations as described in the first embodiment.

As illustrated in FIG. 10, the color conversion unit 30 includes a background color pixel comparing unit 31, a monochromatic conversion unit 32, a pattern generating unit 33, a pattern storing unit 34, and a color conversion processing unit 35 that functions as a synthesizing unit. Herein, the pattern storing unit 34 and the color conversion processing unit 35 have the same functions and configurations to the pattern storing unit 13 and the color conversion processing unit 14, respectively, according to the first embodiment.

The object type determining unit 2 also has the same functions and configuration to the object type determining unit 2 according to the first embodiment, and outputs the object information to the background area extracting unit 3 and to the background color pixel comparing unit 31, the monochromatic conversion unit 32, and the pattern generating unit 33 included in the color conversion unit 30.

The background area extracting unit 3 has the same functions and configuration to the background area extracting unit 3 according to the first embodiment, and outputs the background area information to the background color pixel comparing unit 31 and the pattern generating unit 33 of the color conversion unit 30. Moreover, with respect to a CMYK image expanded in the image storing unit 6, the background area extracting unit 3 according to the second embodiment counts, as the background area information of an extracted background area, the number of pixels having at least one of the CMYK data values not equal to "0" within the extracted background area. Then, along with the drawing start address and the drawing end address of the background area with a color character group drawn thereon, the background area extracting unit 3 outputs the CMYK pixel count result to the background color pixel comparing unit 31 and the pattern generating unit 33 included in the color conversion unit 30.

Thus, the background color pixel comparing unit 31 of the color conversion unit 30 receives the input color image data and the object information from the object type determining unit 2, and receives the background area information from the background area extracting unit 3. Then, the background color pixel comparing unit 31 determines whether a drawing object to be controlled is a color character group. If the drawing object is a color character group, then the background color pixel comparing unit 31 compares the CMYK pixel count result that is included in the background area information input from the background area extracting unit 3 with threshold values th1 and th2 that are set in advance, and outputs the determination result to the monochromatic conversion unit 32 and to the pattern generating unit 33.

The threshold value th1 is set for the purpose of determining whether a background area with a color character group drawn thereon also includes image data regarding a drawing object other than the color character group. If the CMYK pixel count result is equal to or greater than the threshold value th1, then it is determined that some other image data is present on the background area. The threshold value th2 is set so as to satisfy the relation th2>th1 and, if the CMYK pixel count result is equal to or greater than the threshold value th2, then it is determined that the image data present on the background area with the color character group drawn thereon has a color of higher density than a predetermined density.

More particularly, if the CMYK pixel count result is smaller than the threshold value th1, then the background color pixel comparing unit 31 outputs a determination result "0" indicating that no other image data is present on the background area. Moreover, if the CMYK pixel count result is equal to or greater than the threshold value th1 but smaller than the threshold value th2; then the background color pixel comparing unit 31 outputs a determination result "1" indicating that, although some other image data is present on the background area, it has a color of density equal to or smaller than the predetermined density, that is, it includes pixels of medium density. Furthermore, if the CMYK pixel count result is equal to or more than the threshold value th2, then the background color pixel comparing unit 31 outputs a determination result "2" indicating that some other image data having a color of higher density than the predetermined density is present on the background area.

The pattern generating unit 33 receives the printing color information from the computer PC, receives the input color image and the object information from the object type determining unit 2, receives the background area information from the background area extracting unit 3, and receives the determination result from the background color pixel comparing unit 31. In an identical manner to the pattern generating unit 12 according to the first embodiment, the pattern generating unit 33 generates, according to the hue H of the characters in a color character group, the pattern image data to be added to the background area of that color character group. Besides, only when the determination result of the background color pixel comparing unit 31 indicates that no other image data is present on the background area, that is, only when the determination result is "0"; the pattern generating unit 33 generates the pattern image data and outputs it to the color conversion processing unit 35.

The monochromatic conversion unit 32 receives the printing color information from the computer PC, receives the input color image data and the object information from the object type determining unit 2, and receives the determination result from the background color pixel comparing unit 31. Then, the monochromatic conversion unit 32 determines, from the object information input from the object type determining unit 2, whether a drawing object to be controlled is a color character group. If the drawing object to be controlled is other than a color character group, then the monochromatic conversion unit 32 performs monochromatic conversion of that drawing object on the basis of the luminance value.

That is, if the drawing object to be controlled is other than a color character group; then, in an identical to the first embodiment, the monochromatic conversion unit 32 converts the color information (Ri, Gi, Bi) of the input color image data received from the object type determining unit 2 into the luminance value Yi and converts the post-monochromatic-conversion color information (Ro, Go, Bo) into (Yi, Yi, Yi).

On the other hand, if the drawing object to be controlled is a color character group, then the monochromatic conversion unit 32 performs monochromatic conversion upon referring to the determination result of comparison between the CMYK pixel count result and the threshold values th1 and th2 that is received from the background color pixel comparing unit 31. More particularly, consider the case when the determination result is "2", that is, when the CMYK pixel count result is equal to or greater than the threshold value th2. In that case, since a color of high density is present on the background area, the monochromatic conversion unit 32 performs monochromatic conversion in such a way that the post-monochromatic-conversion color character group has the luminance equal to the maximum luminance of the main color specified in the printing color information, so that there is a high contrast between the color character group and the corresponding background area. For example, the monochromatic conversion unit 32 converts the post-monochromatic-conversion color information (Ro, Go, Bo) into (Ro, Go, Bo)=(255, 255, 255), that is, into the white color having the maximum luminance of the main color specified in the printing color information.

Consider the case when the determination result is "1", that is, when the CMYK pixel count result is equal to or greater than the threshold value th1 but smaller than the threshold value th2. In that case, the monochromatic conversion unit 32 performs monochromatic conversion in such a way that the post-monochromatic-conversion color character group has the luminance equal to the minimum luminance of the main color specified in the printing color information For example, the monochromatic conversion unit 32 converts the post-monochromatic-conversion color information (Ro, Go, Bo) into (Ro, Go, Bo)=(0, 0, 0).

Explained below with reference,to FIG. 11 is a background pixel determining operation performed by the background color pixel comparing unit 31 according to the present embodiment.

The background color pixel comparing unit 31 performs the background pixel determining operation during which it is determined whether CMYK data not having the CMYK data value equal to "0" is present in the pixels of the background area of a color character group and, if such CMYK data is present, it is determined whether the color density thereof is higher than a predetermined density.

That is, upon receiving the input color image data and the object information from the object type determining unit 2 and upon receiving the background area information from the background area extracting unit 3, the background color pixel comparing unit 31 determines whether the object information to be controlled belongs to a color character group (Step S401).

If the drawing object to be controlled is not a color character group (No at Step S401), then the background color pixel comparing unit 31 determines it unnecessary to perform background area pixel determination for the color character group and ends the background pixel determining operation. In contrast, if the drawing object to be controlled is a color character group (Yes at Step S401), then the background color pixel comparing unit 31 refers to the CMYK pixel count result included in the background area information received from the background area extracting unit 3, and, in order to determine whether some other image data is present in the background area having drawn thereon a color character group set in advance, determines whether the CMYK pixel count result is equal to or greater than the threshold value th1 (Step S402).

Meanwhile, in the present embodiment, although the comparison is made using the pixel count of image data present in a background area, it is also possible to calculate a CMYK pixel ratio per unit area by dividing the CMYK pixel count result by the total pixel count in that background area, and then use the CMYK pixel ratio for the comparison purpose.

If the CMYK pixel count result is smaller than, the threshold value th1 (No at Step S402), then the background color pixel comparing unit 31 determines that no other image data is present on the background area with a color character group drawn thereon and sets the determination result as "0" (Step S403) before ending the background pixel determining operation.

On the other hand, if the CMYK pixel count result is equal to or greater than the threshold value th1 (Yes at Step S402); then, in order to determine whether the image data present on the background area with a color character group drawn thereon has a higher density than a predetermined density, the background color pixel comparing unit 31 determines whether the CMYK pixel count result is equal to or greater than the threshold value th2 (Step S404).

If the CMYK pixel count result is smaller than the threshold value th2 (No at Step S404), then the background color pixel comparing unit 31 sets the determination result as "1" (Step S405) and ends the background pixel determining operation.

In contrast, if the CMYK pixel count result is equal to or greater than the threshold value th2 (Yes at Step S404), then the background color pixel comparing unit 31 sets the determination result as "2" (Step S406) and ends the background pixel determining operation.

Subsequently, the background color pixel comparing unit 31 outputs the determination result to the monochromatic conversion unit 32 and to the pattern generating unit 33.

Explained below with reference to FIG. 12 is the pattern image generating operation performed by the pattern generating unit 33. Herein, the pattern generating unit 33 generates, according to the hue H of the characters in a color character group, the pattern image data to be added to the background area of that color character group. Besides, only when the determination result of the background color pixel comparing unit 31 indicates that no other image data is present on the background area, the pattern generating unit 33 generates the pattern image data and outputs it to the color conversion processing unit 35.

Firstly, the pattern generating unit 33 determines whether a drawing object to be controlled is a color character group (Step S501). If the drawing object to be controlled is not a color character group (No at Step S501), then the pattern image generating operation is terminated because there is no need to generate pattern image data.

Thus, when the drawing object to be controlled is a color character group (Yes at Step S501), the pattern generating unit 33 determines whether the determination result received from the background color pixel comparing unit 31 is "0" (Step S502). If the determination result is not "0" (No at Step S502), then the pattern generating unit 33 determines that image data is present on the background area of that color character group and ends the pattern image generating operation without generating pattern image data.

If the determination result is "0" (Yes at Step S502); then, in an identical manner to that in the first embodiment, the pattern generating unit 33 calculates the hue H of the characters in the color character group (Step S503) and generates pattern image data according to the hue H of the characters in the color character group (Step S504). Moreover, in this case, if it is determined that the transparency color is specified as the color expression color in the printing color information, then the pattern generating unit 33 can generate pattern image data of the transparency component in an identical manner to that in the first embodiment.

In this way, if a drawing object other than a color character group is also present on the background area (rectangular area) of that color character group, then the image processing apparatus 20 according to the second embodiment refrains from generating the design pattern image data or the density pattern image data with respect to that background area.

Thus, for example, with respect to a hatched pattern or a color character group on a colored background included in the input color image data, the design pattern image data or the density pattern image data is not generated in the corresponding background area. That is, only with respect to a color character group on the white background, the design pattern image data or the density pattern image data is generated in the corresponding background area according to the hue H of the characters in the color character group. Hence, according to the present embodiment, any image data present on the background area of a color character group can be prevented from being lost due to the design pattern image data or the density pattern image data. That makes it possible to perform appropriate image processing.

Moreover, with respect to the color character groups present on the colored background of a high density, the image processing apparatus 20 according to the second embodiment performs conversion in such a way that the color character group in a high density background becomes white. That enables achieving enhancement in the viewability of the post-monochromatic-conversion color character groups.

Third Embodiment

Figure 13:
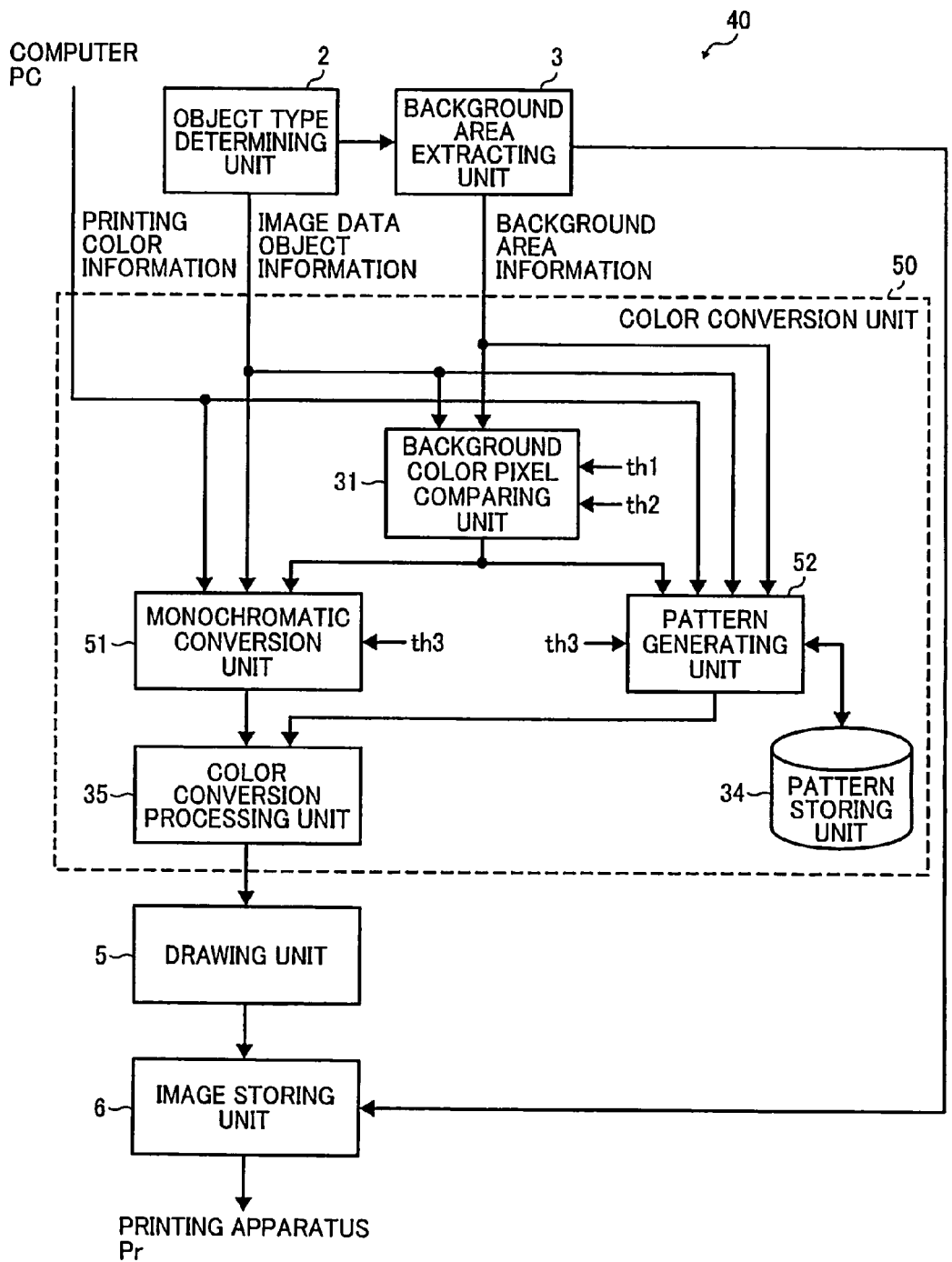
FIG. 13 is a block diagram of a functional configuration of an image processing apparatus according to a third embodiment of the present invention.
Figure 14:
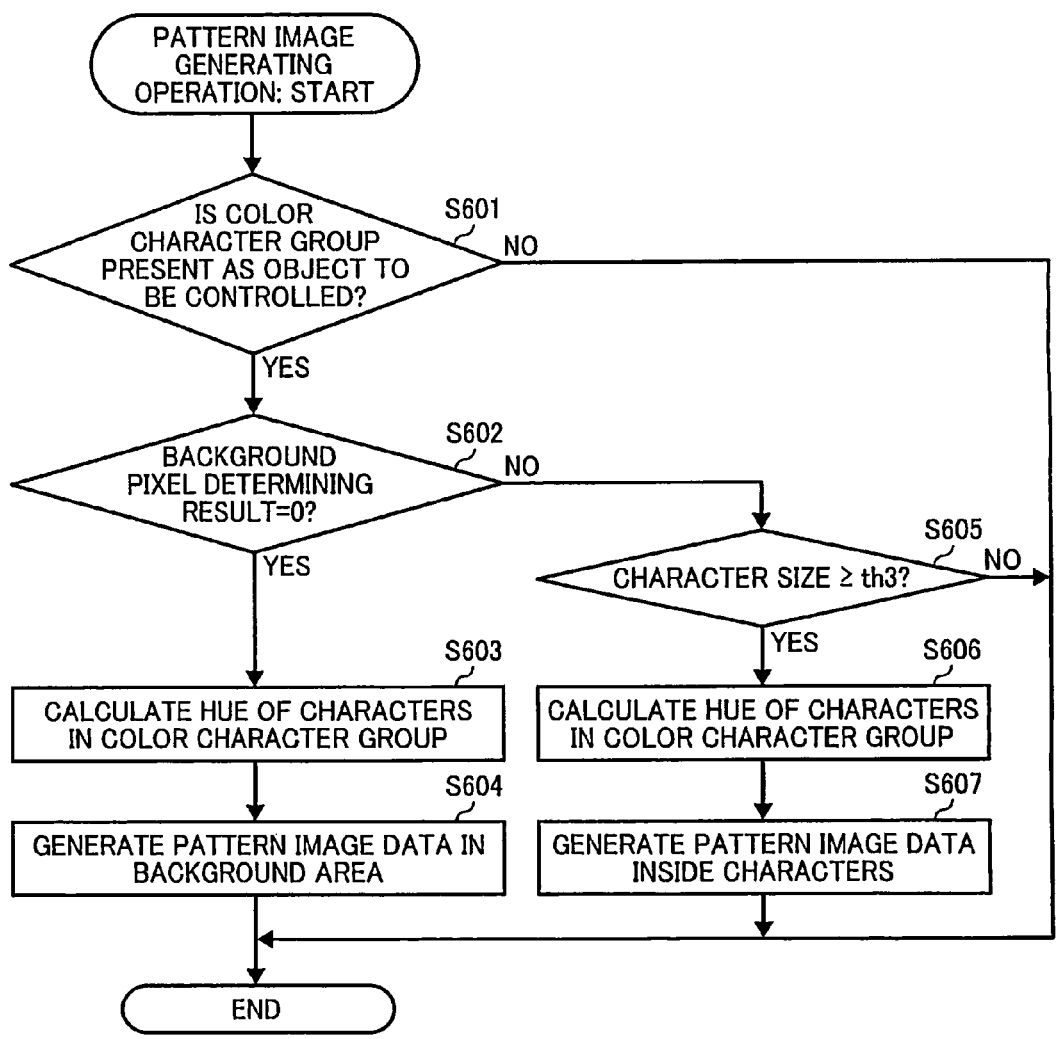
FIG. 14 is a flowchart for explaining the sequence in the pattern image generating operation according to the third embodiment.

FIGS. 13 and 14 are diagrams for explaining an image processing apparatus, an image processing method, and a computer program product according to a third embodiment of the present invention. FIG. 13 is a block diagram of a functional configuration of an image processing apparatus 40 according to the third embodiment.

The image processing apparatus 40 according to the present embodiment is implemented as an image processing apparatus identical to the image processing apparatus 20 according to the second embodiment. In the explanation of the third embodiment, the constituent elements identical to those in the image processing apparatus 20 according to the second embodiment are referred to by the same reference numerals and the explanation thereof is not repeated or is given only briefly.

In the image processing apparatus 40 according to the present embodiment, on the background area of a color character group, if image data such as a hatched pattern or a color character group on a colored background is present; then the pattern image data is not generated, and, only when the color character group is larger than a predetermined size, the pattern image data is generated inside the color character group. That is, even when some other image data is present on the background area of a color character group, the image processing apparatus 40 still generates pattern image data with respect to the inside of the characters in that color character group if the character size is large.

As illustrated in FIG. 13, the image processing apparatus 40 according to the present embodiment includes the object type determining unit 2, the background area extracting unit 3, the drawing unit 5, the image storing unit 6, and a color conversion unit 50. Herein, the object type determining unit 2, the background area extracting unit 3, the drawing unit 5, and the image storing unit 6 have the same functions and configurations as described in the second embodiment.

As illustrated in FIG. 13, the color conversion unit 50 includes the background color pixel comparing unit 31, a monochromatic conversion unit 51, a pattern generating unit 52, the pattern storing unit 34, and the color conversion processing unit 35 that functions as a synthesizing unit. Herein, the background color pixel comparing unit 31, the pattern storing unit 34, and the color conversion processing unit 35 have the same functions and configurations as described in the second embodiment.

The pattern generating unit 52 receives the printing color information from the computer PC, receives the input color image and the object information from the object type determining unit 2; receives the background area information from the background area extracting unit 3, and receives the determination result from the background color pixel comparing unit 31. In addition, the pattern generating unit 52 receives input of a threshold value th3, which is set for the purpose of determining whether the characters in a color character group are of a predetermined character size.

In an identical manner to the pattern generating unit 33 according to the second embodiment, the pattern generating unit 52 generates, according to the hue H of the characters in a color character group, the pattern image data to be added to the background area of that color character group. Besides, only when the determination result of the background color pixel comparing unit 31 indicates that no other image data is present on the background area, the pattern generating unit 52 generates pattern image data in the background area. On the other hand, in the case when some other image data is present on a background area; only when the character size of the corresponding color character group is equal to or greater than the threshold value th3, the pattern generating unit 52 generates pattern image data in the characters of that color character group, and outputs the pattern image data to the color conversion processing unit 35.

The monochromatic conversion unit 51 receives the printing color information from the computer PC, receives the input color image data and the object information from the object type determining unit 2, and receives input of the threshold value th3 set for the purpose of determining whether the characters in the color character group are of a predetermined character size. Then, the monochromatic conversion unit 51 determines, by referring to the object information input from the object type determining unit 2, whether a drawing object to be controlled is a color character group. If the drawing object to be controlled is other than a color character group, then the monochromatic conversion unit 51 performs monochromatic conversion of that object on the basis of the luminance value. On the other hand, if the drawing object to be controlled is a color character group, then the monochromatic conversion unit 51 performs color conversion based on whether the character size of the color character group is equal to or greater than the threshold value th3.

That is, if the drawing object to be controlled is other than a color character group; then, in an identical manner to that in the first embodiment, the monochromatic conversion unit 51 converts the color information (Ri, Gi, Bi) of the input color image data into the luminance value Yi and converts the post-monochromatic-conversion color information (Ro, Go, Bo) into (Yi, Yi, Yi).

On the other hand, if the drawing object to be controlled is a color character group and if the determination result of the background color pixel comparing unit 31 is "2" indicating that the CMYK pixel count result is equal to or greater than the threshold value th2, then the monochromatic conversion unit 51 converts the post-monochromatic-conversion color information (Ro, Go, Bo) into (Ro, Go, Bo)=(255, 255, 255). However, if the drawing object to be controlled is a color character group and if the determination result is "1" indicating that the CMYK pixel count result is equal to or greater than the threshold value th1 but smaller than the threshold value th2, then the monochromatic conversion unit 51 compares the character size with the threshold value th3 and, if the character size is equal to greater than the threshold value th3, converts the post-monochromatic-conversion color information (Ro, Go, Bo) into color information having intermediate density (e.g., 128) (into (Ro, Go, Bo)=(255, 255, 255)). In contrast, if the determination result is "1" indicating that the CMYK pixel count result is equal to or greater than the, threshold value th1 but smaller than not only the threshold value th2 but also the threshold value th3, then the monochromatic conversion unit 51 converts the post-monochromatic-conversion color information (Ro, Go, Bo) into (Ro, Go, Bo)=(0, 0, 0) having the minimum luminance.

Similarly, when the determination result by the background color pixel comparing unit 31 is "0" indicating that no other image data is present on the background area, then the monochromatic conversion unit 51 converts the post-monochromatic-conversion color information (Ro, Go, Bo) into (Ro, Go, Bo)=(0, 0, 0) having the minimum luminance.

Explained below with reference to FIG. 14 is the pattern image generating operation performed by the pattern generating unit 52.

Firstly, the pattern generating unit 52 receives the input color image data and the object information from the object type determining unit 2, and determines whether a drawing object to be controlled is a color character group (Step S601).

If the drawing object to be controlled is not a color character group (No at Step S601), then the pattern image generating operation is terminated because there is no need to generate pattern image data. Thus, only when the drawing object to be controlled is a color character group (Yes at Step S601), the pattern generating unit 52 determines whether the determination result received from the background color pixel comparing unit 31 is "0" (Step S602).

If the determination result is "0" (Yes at Step S602); then the pattern generating unit 52 determines that no other image data is present on the background area of the color character group and, in an identical manner to that in the first embodiment, calculates the hue H of the characters in the color character group (Step S603) and generates pattern image data according to the hue H of the characters in the color character group (Step S604). Moreover, in this case, if it is determined that the transparency color is specified as the color expression color in the printing color information, then the pattern generating unit 52 can generate pattern image data of the transparency component in an identical manner to that in the first embodiment.

If the determination result is not "0" (No at Step S602), then the pattern generating unit 52 determines that some other image data is present on the background area of that color character group and then determines whether the character size of the color character group is equal to or greater than the threshold value th3, which is set for the purpose of determining whether the characters in a color character group are of a predetermined character size (Step S605). If the character size is smaller than the threshold value th3 (No at Step S605), then the pattern generating unit 52 ends the pattern image generating operation without generating pattern image data.

On the other hand, if the character size is equal to or greater than the threshold value th3 (Yes at Step S605); then, in an identical manner to that in the first embodiment, the pattern generating unit 52 calculates the hue H of the characters in the color character group (Step S606) and generates pattern image data according to the hue H of the characters in the color character group (Step S607), and outputs the pattern image data to the color conversion processing unit 35.

In this way, if a drawing object other than a color character group is present on the background area of that color character group, then the image processing apparatus 40 according to the third embodiment generates the design pattern image data or the density pattern image data with respect to that background area only inside the characters in the color character group.

Hence, the color discrimination property regarding the color character groups can be put forth while preventing the image data present on the background area of the color character groups from being lost. That makes it possible to perform appropriate image processing.

Moreover, in the case when a drawing object other than a color character group is also present on the background area of that color character group; only when the character size of the color character group is equal to or larger than the threshold value th3, the image processing apparatus 40 according to the third embodiment generates the design pattern image data or the density pattern image data with respect to that background area only inside the characters in the color character group.

Hence, the color discrimination property regarding the color character groups can be put forth while not only preventing the image data present on the background area of a color character group from being lost due to the design pattern image data or the density pattern image data, but also retaining the appropriateness of the color character group. That makes it possible to perform more appropriate image processing.

Furthermore, in the image processing apparatus 40 according to the present embodiment too, when the transparency color is specified as the color expression color, the color discrimination property regarding the color character groups can be put forth by means of different degrees of glossiness. That makes it possible to perform more appropriate image processing.

Meanwhile, the image processing program executed in the image processing apparatuses according to the first to third embodiments is a computer-executable program, written either in a legacy programming language or an object-oriented programming language, such as assembler, C, C++, C#, or Java (registered trademark). The image processing program is stored in advance in a read only memory (ROM) or the like for distribution.

Alternatively, the image processing program executed in the image processing apparatuses according to the first to third embodiments can be provided in the form of an installable file or an executable file on a computer-readable recording medium such as a compact disk read only memory (CD-ROM), a flexible disk (FD), a compact disk recordable (CD-R), or a digital versatile disk (DVD).

Still alternatively, the image processing program executed in the image processing apparatuses according to the first to third embodiments can be saved on a computer connected to a network such as the Internet and can be downloaded therefrom via the network. Still alternatively, the image processing program executed in the image processing apparatuses according to the first to third embodiments can be made available for distribution through a network such as the Internet.

The image processing program executed in the image processing apparatuses according to the first to third embodiments contains modules for the abovementioned constituent elements (the object type determining unit, the background area extracting unit, the drawing unit, the color conversion unit, the background color pixel comparing unit, the monochromatic conversion unit, the pattern generating unit, the pattern storing unit, and the color conversion processing unit). In practice, a central processing unit (CPU: processor) retrieves the image processing program from the ROM and runs it such that the image processing program is loaded in a corresponding main memory. As a result, the modules for the object type determining unit, the background area extracting unit, the drawing unit, the color conversion unit, the background color pixel comparing unit, the monochromatic conversion unit, the pattern generating unit, the pattern storing unit, and the color conversion processing unit are generated in the main memory.

Herein, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

In this way, according to an aspect of the present invention, even in the case when the input color image data is converted into two-color data before being output, enhancement can be achieved in the character viewability and the color discrimination property of the input color image data when the color image data output.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an object type determining unit that, for each drawing object in input image data, makes use of a type and color information of the drawing object and determines whether the drawing object includes a color character group of a single or more characters;
    a background area extracting unit that, when the drawing object is determined to include the color character group, extracts a background area on which the color character group is formed in the drawing object for each color character group;
    a monochromatic conversion unit that receives specification of a main color as a printing color and specification of a color expression color, and,
        when the drawing object is determined not to include the color character group, generates monochromatic image data by performing monochromatic conversion of the input image data with a predetermined luminance value, and
        when the drawing object is determined to include the color character group, generates monochromatic image data by performing monochromatic conversion of the input image data with minimum luminance of the main color;
    a pattern generating unit that, when the drawing object is determined to include the color character group, obtains a hue of the color character group and, according to the hue, generates pattern image data to be added to the background area of post-monochromatic-conversion color character group; and
    a synthesizing unit that synthesizes the monochromatic image data and the pattern image data.

2. The image processing apparatus according to claim 1, wherein,
    when transparency color is specified as the color expression color, the pattern generating unit generates the pattern image data in the transparency color.

3. The image processing apparatus according to claim 1, further comprising
    a background area determining unit that determines whether a drawing object other than the color character group is present on the background area, wherein
    when a drawing object other than the color character group is determined to be present on the background area, the pattern generating unit does not generate the pattern image data.

4. The image processing apparatus according to claim 3, wherein
    the background area extracting unit further obtains, as a count result, the number of pixels having at least one of color pixel values not equal to 0 within the background area, and the background area determining unit compares the count result with a first threshold value, and, if the count result is smaller than the first threshold value, determines that image data of a drawing object other than the color character group is not present on the background area.

5. The image processing apparatus according to claim 4, wherein,
when the count result is equal to or larger than the first threshold value, the background area determining unit determines that the image data is present on the background area.

6. The image processing apparatus according to claim 5, wherein,
when the count result is equal to or larger than the first threshold value, the background area determining unit further compares the count result with a second threshold value that is larger than the first threshold value, and, if the count result is equal to or larger than the first threshold value but smaller than the second threshold value, determines that the image data having a density equal to or lower than a predetermined density is present on the background area.

7. The image processing apparatus according to claim 6, wherein,
when the image data having a density equal to or lower than the predetermined density is determined to be present on the background area, the monochromatic conversion unit converts the color of the color character group to the main color having the minimum luminance.

8. The image processing apparatus according to claim 6, wherein,
when the count result is equal to or larger than the second threshold value, the background area determining unit determines that the image data having a density higher than the predetermined density is present on the background area.

9. The image processing apparatus according to claim 8, wherein,
when the image data having a density higher than the predetermined density is determined to be present on the background area, the monochromatic conversion unit converts the color of the color character group into the main color having the maximum luminance.

10. The image processing apparatus according to claim 3, wherein,
when a drawing object other than the color character group is determined to be present on the background area, the pattern generating unit compares the character size of the color character group with a third threshold value, and, if the character size of the color character group is equal to or larger than the third threshold value, generates pattern image data to be added inside post-monochromatic-conversion color character group.

11. The image processing apparatus according to claim 10, wherein,
when the character size of the color character group is equal to or larger than the third threshold value, the monochromatic conversion unit converts the color of the color character group to the main color having a predetermined luminance.

12. The image processing apparatus according to claim 11, wherein
the background area extracting unit further obtains, as a count result, the number of pixels having at least one of color pixel values not equal to 0 within the background area, and
the background area determining unit compares the count result with the first threshold value and with the second threshold value that is larger than the first threshold value, and, if the count result is equal to or larger than the first threshold value but smaller than the second threshold value and if the character size of the color character group is equal to or larger than the third threshold value, converts the color of the color character group into the main color having the predetermined luminance.

13. The image processing apparatus according to claim 11, wherein,
when the character size of the color character group is smaller than the third threshold value, the monochromatic conversion unit converts the color of the color character group into the main color having the maximum luminance.

14. The image processing apparatus according to claim 13, wherein
the background area extracting unit further obtains, as a count result, number of pixels having at least one of color pixel values not equal to 0 within the background area, and
the background area determining unit compares the count result with the first threshold value and with the second threshold value that is larger than the first threshold value, and, if the count result is equal to or larger than the first threshold value but smaller than the second threshold value and if the character size of the color character group is smaller than the third threshold value, converts the color of the color character group into the main color having the maximum luminance.

15. The image processing apparatus according to claim 1, further comprising
a pattern storing unit that stores therein in advance the pattern image data that is different for each of a predetermined number of hue ranges, wherein
the pattern generating unit
obtains a hue from color information of the input image data,
retrieves the pattern image data corresponding to the hue range to which the obtained hue belongs, and
adds the retrieved pattern data to the background area.

16. The image processing apparatus according to claim 15, wherein
the pattern storing unit stores therein in advance pattern image data of a different design for each of the predetermined number of hue ranges.

17. The image processing apparatus according to claim 15, wherein
the pattern storing unit stores therein in advance pattern image data of a different density for each of the predetermined number of hue ranges.

18. An image processing method implemented in an image processing apparatus, comprising:
determining, with respect to each drawing object in input image data, whether the drawing object includes a color character group of a single or more characters by making use of a type and color information of the drawing object;
extracting, when the drawing object is determined to include the color character group, a background area on which the color character group is formed in the drawing object for each color character group;
first-generating that includes receiving specification of a main color as a printing color and specification of a color expression color, and, when the drawing object is determined not to include the color character group, generating monochromatic image data by performing monochromatic conversion of the input image data with a predetermined luminance value, and when the drawing object is determined to include the color character group, generating monochromatic image data by performing monochromatic conversion of the input image data with minimum luminance of the main color;

second-generating that includes obtaining, when the drawing object is determined to include the color character group, a hue of the color character group and, according to the hue, generating pattern image data to be added to the background area of post-monochromatic-conversion color character group; and synthesizing the monochromatic image data and the pattern image data.

19. A computer program product comprising a non-transitory computer-usable medium having computer-readable program codes embodied in the medium for an image processing method implemented in an image processing apparatus, the program codes when executed causing a computer to execute:

determining, with respect to each drawing object in input image data, whether the drawing object includes a color character group of a single or more characters by making use of a type and color information of the drawing object;

extracting, when the drawing object is determined to include the color character group, a background area on which the color character group is formed in the drawing object for each color character group;

first-generating that includes receiving specification of a main color as a printing color and specification of a color expression color, and, when the drawing object is determined not to include the color character group, generating monochromatic image data by performing monochromatic conversion of the input image data with a predetermined luminance value, and when the drawing object is determined to include the color character group, generating monochromatic image data by performing monochromatic conversion of the input image data with minimum luminance of the main color;

second-generating that includes obtaining, when the drawing object is determined to include the color character group, a hue of the color character group and, according to the hue, generating pattern image data to be added to the background area of post-monochromatic-conversion color character group; and synthesizing the monochromatic image data and the pattern image data.

* * * * *